3,078,286
α-NAPHTHOL DERIVATIVES
William H. Hunter, Sandwich, Ronald J. Boscott, Deal, Peter H. Sherman, Ramsgate, and Charles R. Worthing, Chadwell Heath, England, assignors to Chas. Pfizer & Co., Inc., New York, N.Y.
No Drawing. Filed Apr. 4, 1961, Ser. No. 100,521
Claims priority, application Great Britain Apr. 7, 1960
6 Claims. (Cl. 260—410.5)

The present invention relates to chemical compounds having physiological activity and, in particular, activity as muscle relaxants. They also may be used as anti-convulsants.

Accordingly, the present invention comprises compounds of the formula:

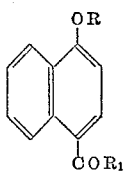

wherein R is selected from the group consisting of

—$CH_2COR_2$

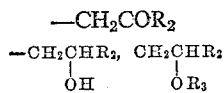

and —$CH_2CH_2OH$; $R_1$ is selected from the group consisting of lower alkyl having up to 6 carbon atoms, —$CH_2OH$, —$CH_2CH_2OH$, —$CH_2OOCCH_3$, phenyl and —$(CH_2)_xO(CH_2)_yCH_3$ wherein $x$ is an integer from 1 to 5, $y$ is a whole number from 0 to 4 and $x$ plus $y$ equals an integer from 1 to 5; $R_2$ is a lower alkyl radical, preferably a straight chain one, having up to six carbon atoms; and $R_3$ is an acyl radical.

The $R_3$ acyl radical can be quite varied. For instance, it can be the acyl radical of a hydrocarbon acid or a hydrocarbon acid substituted by chloro, di-(lower alkyl) amino, ω-carboxy or ω-carboalkoxy. Also, benzoic acid along with its lower alkoxy, sulfonic and carboxy substituted analogs; heterocyclic carboxylic acids; arylsulfonic acids; carbamic acid and the N-(lower alkyl) carbamic acids; and aralkyl acids such as benzilic acid may be used.

Some of these acids impart additional properties to the α-naphthol derivatives of the invention. The nicotinate, isonicotinate and the half esters of succinic and phthalic acids are water soluble and consequently are of interest for injection purposes. The higher alkanoyl esters such as palmitoyl, oleyl and lauroyl are oil soluble; they are valuable for intramuscular preparation.

The compounds of the present invention may be made by several methods. I. For example, compounds in which R represents $CH_2COR_2$ may be made by:

(a) The reaction of the appropriate halo ketone, for example, the chloro or bromo-derivative, with the appropriate 4-acyl-1-naphthol. Examples of halo ketones which may be used in such a reaction are:

$ClCH_2COC_2H_5$
$ClCH_2COCH_2CH_3$
$ClCH_2COCH_2CH_2CH_3$
$ClCH_2CO(CH_2)_5CH_3$

The reaction is carried out in an organic solvent, for example, acetone in the presence of an acid acceptor, for example, an alkali metal hydroxide, carbonate or bicarbonate. In order to obtain the highest yield, it is desirable that sufficient acid acceptor is present to neutralize all the halo-acid formed during the reaction.

(b) The oxidation of the corresponding secondary alcohol, the preparation of which is described below, or, (c) By the hydration of the appropriate acetylene compound.

II. The compounds in which R represents $CH_2CH(OH)R_2$ (i.e. the secondary alcohols) may be made, for example, by:

(a) The reaction of the appropriate epoxide, for example, propylene oxide, or butylene oxide, in the presence of a suitable basic catalyst (for example, alkali metal hydroxides, carbonates, bicarbonates, formates or acetates) with the appropriate 4-acyl-1-naphthol. Sodium acetate has been found particularly suitable for use in this reaction.

(b) The reaction of the appropriate chlorhydrin with the appropriate 4-acyl-naphthol, preferably in the presence of an acid acceptor. Within the scope of the present invention the $R_2$ group of the $OCH_2CH(OH)R_2$ group may be:

—$CH_3$     —$C_3H_7$     —$C_5H_{11}$
—$C_2H_5$   —$C_4H_9$     —$C_6H_{13}$

The product may then be recovered, for example, by pouring into water, whereby the compound is precipitated. The product may be purified further, for example, by distillation, if required.

III. The compounds of the present invention in which R is

may be prepared by several general methods.

(a) For example, the secondary alcohol may be reacted with an acid halide, for instance the chloride. The reaction is conveniently carried out at room temperature in a solvent such as pyridine which is water soluble and an acid acceptor. The product may then be recovered by pouring the reaction mixture into water in which the pyridine dissolves and from which the ester is precipitated and may be recovered by filtration or by extraction by a suitable solvent.

(b) Alternatively, the secondary alcohol may be reacted, under conditions similar to those in the preceding paragraph, with the appropriate acid anhydride, for example, according to the formulas:

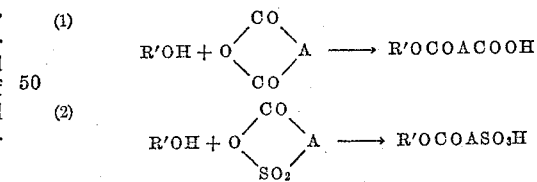

IV. The compounds of the present invention in which R is $CH_2CH_2OH$ may also be made by several methods.

(a) The appropriate 4-acyl-1-naphthol may be reacted with a haloethanol, for example chloro- or bromoethanol, in the presence of an acid acceptor, for example an alkali metal hydroxide carbonate or bicarbonate. In order to obtain a high yield it is desirable that sufficient acid acceptor is present to neutralize all the halo-acid formed during the reaction.

(b) The appropriate 4-acyl-1-naphthol may be reacted with ethylene oxide in the presence of a suitable catalyst, for example an alkali metal hydroxide, carbonate, bicarbonate, formate or acetate.

In view of the low boiling point of ethylene oxide, it is desirable to carry out this reaction under pressure.

(c) The appropriate 4-acyl-1-naphthol may be reacted with ethylene carbonate. This reaction is suitably carried out in an organic solvent, for example toluene, in the presence of a catalyst such as an alkali metal carbonate.

Examples of 4 acyl-1-naphthol which may be used are those in which the acyl group is:

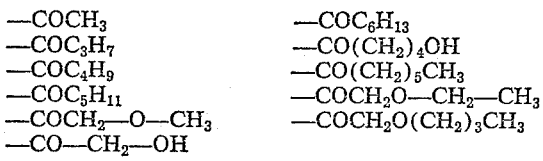

However, an acyl radical of a lower carboxylic acid, such as acetic acid, is preferred with those compounds in which R is

The compounds of the present invention generally show a marked lack of toxicity when administered orally, for example, in doses of up to 10 g. per kilogram of body weight, when tested on mice.

The compounds may be administered orally or parenterally in humans, usually in a pharmaceutical formulation containing a non-toxic solid or liquid carrier.

Examples of solid non-toxic carriers which may be used, for example for oral administration are starches, lactose or other sugars, mannitol, inert clays, for example, kaolin, or inorganic salts such as phosphates or chlorides.

Liquid non-toxic carriers which may be used, either for parenteral or oral administration as suspensions or elixirs, are aqueous saline or glucose solutions in the case of injectable preparations or solutions containing fruit flavorings and/or coloring agents for oral administration.

The amount of the compounds administered will depend upon the particular compound chosen, upon the patient to be treated and upon the method of administration. Generally, quantities up to about 500 mg. are useful for a single intramuscular injection, while still larger amounts per dose may be used in oral treatment, for example up to 2 grams or more.

It is preferred that the present compounds are administered in formulations which contain at least 0.05% by weight of the compound.

The following examples show methods of preparing the present compounds.

In these examples the terms "parts by weight" and "parts by volume" bear the same relationship as do grams to millilitres.

Example 1

Twenty seven parts by weight of 4-acetyl-1-naphthol, 14 parts by weight chloroacetone, 21 parts by weight anhydrous potassum carbonate, 3 parts by weight potassium iodide and 250 parts by volume acetone were heated under reflux with stirring for 16 hours.

About 150 parts by volume of acetone were then removed by distillation and the residue was poured into 1000 parts by volume of water.

Sodium hydroxide solution, 10 parts by volume of a 20% aqueous solution, was added and the mixture stirred for 5 minutes. The solid formed was filtered off and comprises 28 parts by weight of (4-acetyl-1-naphthoxy)-acetone. On recrystallization from acetone 21 parts by weight of the pure compound having a melting point of 123° C. were obtained.

Elementary analysis gave the following results: C 74.2; H 5.82.

The theoretical values are C 74.4; H 5.83.

Example 2

The process described in Example 1 was repeated using 16 parts by weight of 1-chloro-butan-2-one in place of chloroacetone.

Twenty eight parts by weight of pure 1-(4-acetyl-1-naphthoxy)butan-2-one having a melting point of 111° C. to 112° were obtained.

Elementary analysis gave the values: C 75.2; H 6.32.
The theoretical values are C 75.0; H 6.29.

Example 3

The process of Example 1 was repeated using 19 parts by weight of 1-chloro-hexan-2-one in place of chloroacetone.

Thirty seven parts by weight of pure 1-(4-acetyl-1-naphthoxy) hexan-2-one were obtained having a melting point of 75° C.

Elementary analysis gave the results: C 76.1; H 7.14.
The theoretical values are C 76.1; H 7.10.

Example 4

The process of Example 1 was repeated using 23 parts by weight 1-chloro-octan-2-one.

Fifteen parts by weight of 1-(4-acetyl-1-naphthoxy)-octan-2-one having a melting point of 68° C. were obtained.

Elementary analysis gave the values: C 76.9; H 7.74.
The theoretical values are C 76.9; H 7.72.

Example 5

Thirty seven parts by weight of 4-acetyl-1-naphthol and 200 parts by weight of 0.45 w./v. sodium hydroxide solution were stirred and warmed to 55° C. Propylene oxide, 56 parts by weight, were added to the mixture over 2 hours while the temperature was raised to 70° C.

Stirring and heating were continued for 12 hours and the mixture poured into 1000 parts by volume of 0.5% aqueous sodium hydroxide with stirring.

The product was filtered and the solid dried and powdered. It was then heated with 100 parts by volume of ether, cooled, filtered and washed with ether.

Forty-three parts by weight of 1-(4-acetyl-1-naphthoxy) propan-2-ol were obtained having a melting point of 116° C.

Elementary analysis gave the values: C, 73.7; H, 6.4.
The theoretical values are C, 73.7; H, 6.6.

Example 6

A mixture of 20 parts by weight of 4-propionyl-1-naphthol, 10 parts by volume of chloroacetone, 250 parts by volume of acetone, 25 parts by weight of anhydrous potassium carbonate and 2 parts by weight of potassium iodide were refluxed with stirring for 15 hours.

The mixture was then treated as in Example 1 and the crude product, after crystallization from acetone gave 9 parts by weight of pure 4-propionyl-1-naphthoxy acetone having a melting point of 101° C. to 102° C.

Elementary analysis gave the values: C, 75.3; H, 6.32.
The theoretical values are C, 75.0; H, 6.25.

Example 7

The process of Example 1 was repeated using 16 parts by weight of 4-benzoyl-1-naphthol, 10 parts by weight 1-chloro-butan-2-one, 10 parts by weight anhydrous potassium carbonate, 1 part by weight potassium iodide and 100 parts by volume acetone.

The mixture was refluxed for 24 hours with stirring and poured into 1500 parts by volume of water.

The ether extract on evaporation gave a product which when crystallized from ether gave 13.5 parts by weight of pure 1-(4-benzoyl-1-naphthoxy) butan-2-one having a melting point of 75° C.

Elementary analysis gave the value C, 79.2; H, 5.59.
The theoretical values are C, 79.2; H, 5.66.

Example 8

A mixture of 25 parts by weight of 4-methoxyacetyl-1-napthol, 13.5 parts by weight 1-chlorobutan-2-one, 150 parts by volume acetone, 24 parts by weight anhydrous potassium carbonate and 2 parts by weight potassium iodide were treated as described in Example 1.

Pure 1-(4-methoxyacetyl-1-naphthoxy) butan-2-one (13 parts by weight) was obtained having a melting point of 74° C.-76.5° C.

Elementary analysis gave the values C, 71.4; H, 6.35. The theoretical values are C, 71.3; H, 6.34.

*Example 9*

A mixture of 37 parts by weight 4-acetyl-1-naphthol, 300 parts by volume acetone, 5 parts by weight potassium iodide, 41 parts by weight anhydrous potassium carbonate and 16.5 parts by weight propargyl bromide was refluxed with stirring for 24 hours.

The product was then treated as described in Example 1 and the crude product crystallized from ethanol.

Twenty nine parts by weight of 3-(4-acetyl-1-naphthoxy) prop-1-yne was obtained having a melting point of 111° C. to 112° C.

Five parts by weight of the product was dissolved in 550 parts by volume of methanol and the solution added slowly to a mixture of 2.5 parts by weight of red mercuric oxide, 1 part by weight boron trifluoride etherate, 0.05 part by weight trichloracetic acid and 5 parts by weight methanol.

The mixture was stirred vigorously for 24 hours and filtered and the filtrate concentrated under reduced pressure to 100 parts by volume. This liquid was poured into 200 parts by weight 10% sulphuric acid and the solid formed was filtered off, washed with water and crystallized from ethanol.

Three parts by weight 4-acetyl-1-napthoxy acetone was obtained having a melting point of 123° C. (as in Example 1).

Elementary analysis gave the value C, 74.2; H, 5.76. The theoretical values are C, 74.4; H, 5.83.

*Example 10*

A solution of 2.4 parts by weight of 1-(4-acetyl-1-naphthoxy) propan-2-ol in 60 parts by volume acetone was stirred and treated with 2 parts by volume of a solution prepared by dissolving 6.7 parts by weight of chromium trioxide in 5.3 parts by volume of concentrated sulphuric acid and diluting to 25 parts by volume, with concentrated sulphuric acid.

The solution remained orange in color on stirring for ten minutes and the supernatant liquid was decanted from the chromium salts. The residue was washed with more acetone and the acetone layers combined and poured into 200 parts water. The precipitated solid was collected, washed with 2 N sodium hydroxide solution and with water, and dried.

The solid was crystallized from ethanol to give 0.5 part 4-acetyl-1-naphthoxy acetone, melting point 120° C. to 123° C. identical with the material prepared as in Example 1.

Elementary analysis gave the values C, 74.1; H, 5.84. The theoretical values are C, 74.4; H, 5.83.

*Example 11*

A mixture of 42 parts by weight of 4-methoxyacetyl-1-naphthol, 15.6 parts by weight of anhydrous sodium acetate, and 200 parts by weight of water was stirred and heated under reflux while 54 parts by volume of propylene oxide were slowly added. The solution was stirred and heated for a further hour, cooled and poured into 500 parts by volume of 4% sodium hydroxide solution. The oil was extracted with chloroform, the extract dried and the chloroform evaporated leaving 41 parts by weight of 4-methoxy-acetyl-1-naphthoxy propan-2-ol as a readily crystallizable oil. This was washed twice by refluxing with 150 parts by weight of ether and finally dried to give 31 parts by weight of the pure compound melting point 90° C. to 91° C.

Elementary analysis of the product gave the values: C, 70.3; H, 6.52.

The theoretical values are C, 70.1; H, 6.61.

The compounds prepared as described in Examples 1 to 10 were administered orally to mice in which convulsions had been induced experimentally by strychnine, electric shock or metrazole and the compounds were found to be effective in controlling the convulsions in doses of 0.125 to 0.25 g. per kilogram body weight.

The compounds were also found to be surprisingly free from toxic effects, for example the L.D.$^{50}$ dose in mice of 1-(4-acetyl-1-naphthoxy) propan-2-ol was approximately 9.3 g. per kilogram body weight.

*Example 12*

12.4 parts by weight of 1-(4-acetyl-1-naphthoxy) propan-2-ol were dissolved in a mixture of 15 parts by volume of acetic acid and 6 parts by volume of acetic anhydride, and 5 parts by weight of fused sodium acetate were added. The mixture was heated on a water bath for 24 hours, cooled and poured into water with vigorous stirring.

Sodium hydroxide solution (20 parts by volume of 20% solution) was added and stirring continued for 15 minutes when a solid formed. This solid was filtered off, washed with water, dried and crystallized from a mixture of 150 parts by volume of 60° to 80° petroleum ether and 10 parts by volume of benzene, forming a white solid having a melting point of 84° C. to 85° C.

The acetate (10.6 parts by weight) was recrystallized once more from petroleum ether/ethyl acetate and the product had a melting point of 85° C.

On elementary analysis the following values were found: C, 71.1; H, 6.37.

The theoretical values are: C, 71.3; H, 6.29.

*Example 13*

11 parts by weight of 1-(4-acetyl-1-naphthoxy) propan-2-ol were dissolved in 25 parts by volume of dry pyridine and 5 parts by weight of succinic anhydride were added. The mixture was allowed to stand over night at 40° C. and was then poured onto ice with vigorous stirring.

A white solid separated out and was filtered off. This solid was dissolved in warm sodium bicarbonate solution, filtered with the addition of charcoal and the filtrate was acidified with dilute hydrochloric acid to precipitate a white solid. The hemisuccinic ester thus produced had a melting point of 162° C.

The product on recrystallising from a mixture of methanol and water gave 13 parts by weight of a product having a melting point of 163° C.

Upon elementary analysis the following values were found: C, 66.1; H, 5.84.

The hemisuccinate ester requires by theory the values C, 66.3; H, 5.81.

*Example 14*

The process described in Example 13 was repeated using 8.3 parts by weight of phthalic anhydride to give 18.7 parts by weight of the hydrogen phthalate ester having a melting point of 207° C. The ester was recrystallized from acetone to give a product having a melting point of 203° C.

On elementary analysis the following values were found: C, 70.4; H, 5.17.

The theoretical values required for the hydrogen phthalate ester are: C, 70.4; H, 5.10.

*Example 15*

The process described in Example 13 was repeated using 9 parts by weight of quinolinic anhydride to give 17 parts by weight of the hydrogen quinolinate ester having a melting point of 175° C.

The product when recrystallized from acetone had a melting point of 192.5° C.

On elementary analysis the following values were found for this product: C, 66.9; H, 4.84; N, 3.53.

The theoretical values required for the hydrogen quinolinate ester are: C, 67.2; H, 4.83; N, 3.56.

Example 16

The process described in Example 13 was repeated using 10.1 parts by weight of sulphobenzoic anhydride, the mixture being warmed on a water bath for 16 hours.

The pyridine solution was poured into water and treated with excess sodium bicarbonate solution. This solution was boiled to drive off the pyridine and on cooling there was obtained 20.1 parts by weight of 1-(4-acetyl-1-naphthoxy)-2-propyl-o-sulphobenzoate sodium salt. This was recrystallized from water to give a product having a melting point of in the range of 170° C. to 173° C. (with decomposition).

Upon elementary analysis the following values were found: C, 56.8; H, 4.36; Na, 5.0.

The theoretical values for this product are: C, 58.7; H, 4.22; Na, 5.11.

Example 17

12.2 parts by weight of 1-(4-acetyl-1-naphthoxy) propan-2-ol were dissolved in 50 parts by volume of dry dioxan and 5 parts by volume of pyridine. The mixture was cooled to 5° C. and treated with a solution of benzoyl chloride (8.4 parts by weight in 10 parts by volume of dioxan).

The mixture was allowed to stand over night at 40° C. then it was poured on ice and stirred until a solid was precipitated. This solid was filtered off, washed, dried and crystallized from 200 parts by weight of 60° to 80° petroleum ether to give 15 parts by weight of the benzoate ester having a melting point of 83.5° C.

Upon elementary analysis the following values were found, C, 76.2; H, 5.81.

The theoretical values for this compound: C, 75.9; H, 5.74.

Example 18

The procedure described in Example 17 was repeated using 10.5 parts by weight of toluene p-sulphonyl chloride to give 13.3 parts by weight of the toluene p-sulphonate ester having a melting point of 128° C.

Upon elementary analysis the following values were found: C, 66.7; H, 5.60.

The theoretical values for this compound are: C, 66.4; H, 5.53.

Example 19

The procedure described in Example 17 was repeated using 6.2 parts by weight of chloroacetyl chloride to give 10.2 grams of the chloroacetate ester.

This product was recrystallized from a mixture of petroleum ether and ethyl acetate giving a final product having a melting point of 99° C.

Upon elementary analysis the following values were found: C, 63.7; H, 5.31.

The theoretical values for this compound are: C, 63.7; H, 5.30.

Example 20

20 parts by weight of 1-(4-acetyl-1-naphthoxy)propan-2-ol, 20 parts by weight of nicotinyl chloride hydrochloride, 150 parts by volume of dry benzene and 15 parts by volume of pyridine were heated together under reflux for 12 hours. The benzene was then extracted with water and with several volumes of dilute acetic acid and then with 2 successive portions (25 parts by volume) of 5 N-hydrochloric acid.

The acid extracts were then diluted to 250 parts by volume with water and 70 parts by volume of 5-N-sodium hydroxide were added slowly with stirring.

A solid was precipitated which was filtered off, washed with water and crystallized from methanol to give 23 parts by weight of the nicotinate ester having a melting point of 98° C.

Upon elementary analysis this product was found to give the following values: C 72.2; N 5.46; H 4.02.

The theoretical values required for this ester are: C 72.2; H 5.48; N 4.01.

The hydrochloride was prepared from this ester and was found to have a melting point of 172° C.

Upon elementary analysis the hydrochloric was found to give the following values: C 65.6; H 5.23.

The theoretrical values of the hydrochloride are: C 65.4; H 5.24.

Example 21

12.2 parts by weight of 1-(4-acetyl-1-naphthoxy)propan-2-ol were dissolved in 450 parts by volume of benzene and treated with phosgene (10 parts by weight dissolved in 80 parts by volume of toluene). The mixture was stirred for 1 hour at room temperature and 7.5 parts by weight of diethylaniline were added and stirring was continued for a further hour.

Three hundred parts by volume of iced water were added with vigorous stirring and the benzene separated out. The benzene layer was stirred with 100 parts by volume of .880 ammonia solution and cooled to 5° C. for 3 hours.

White crystals of the carbamate separated out and were recrystallized from acetone to give a product having a melting point of 177° C. (8 parts by weight).

Upon elementary analysis the following values were found: C 67.1; H 6.07.

The theoretical values required for this compound are: C 66.9; H 5.92.

Example 22

93 parts by weight of 4-acetyl-1-naphthol were dissolved in a solution prepared by dissolving 31 parts by weight of potassium hydroxide in 150 parts by volume of water. The solution was stirred and heated gently while 36 parts by volume of 2-chloroethanol were added over a period of 1 to 2 hours. The heating was continued for a further period of 1–2 hours and the reaction mixture was then poured into a 10% solution of sodium hydroxide.

The product soon solidified and was filtered off and washed with water. On recrystallization from methanol 53 parts by weight of pure 2-(4-acetyl-1-naphthoxy)-ethanol having a melting point in the range 112° C. to 114° C. were obtained.

Elementary analysis of this product gave the following results: C 73.0; H 6.00.

The theoretical values required by the compound produced are: C 73.03; H 6.13.

Example 23

The process described in Example 22 may be repeated using 4-acyl-1-naphthol in which the acyl group is —COCH$_3$  —COCH$_2$O(CH$_2$)$_3$CH$_3$
—COC$_2$H$_5$  —COC$_4$H$_9$
—COC$_3$H$_7$  —COC$_5$H$_{11}$
—COCH$_2$—O—CH$_3$  —COC$_6$H$_{13}$
—COCH$_2$OC$_2$H$_5$  —COCH$_2$OH
—COCH$_2$OC$_3$H$_7$  —COCH$_2$OCOCH$_3$

What is claimed is:
1. A compound of the formula

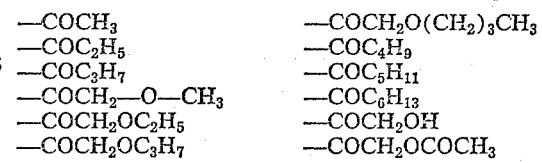

wherein R is selected from the group consisting of

—CH$_2$COR$_2$

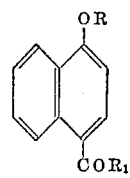

and —CH$_2$CH$_2$OH; R$_1$ is selected from the group consisting of lower alkyl having up to 6 carbon atoms, —CH$_2$OH, —CH$_2$CH$_2$OH, —CH$_2$OOCCH$_3$, phenyl and —(CH$_2$)$_x$O(CH$_2$)$_y$CH$_3$ wherein $x$ is an integer from 1 to 5, $y$ is a whole number from 0 to 4 and $x$ plus $y$ equals an integer from 1 to 5, R$_2$ is a straight chain, lower alkyl radical having up to 6 carbon atoms; and R$_3$ is an acyl radical.

2. A compound of claim 1 wherein R is

—CH$_2$CHCH$_3$
|
OR$_3$

R$_3$ being a member selected from the group consisting of nicotinoyl, isonicotinoyl, monosuccinoyl and monophthaloyl; and R$_1$ is CH$_3$.

3. A compound of claim 1 wherein R is

—CH$_2$CHCH$_3$
|
OR$_3$

R$_3$ being a member selected from the group consisting of palmitoyl, oleyl and lauroyl; and R$_1$ is CH$_3$.

4. 4-acetyl-1-naphthoxy acetone.
5. 1-(4-acetyl-naphthoxy)-propan-2-ol.
6. The hemisuccinate of the compound of claim 5.

No references cited.

UNITED STATES PATENT OFFICE
CERTIFICATE OF CORRECTION

Patent No. 3,078,286                        February 19, 1963

William H. Hunter et al.

It is hereby certified that error appears in the above numbered patent requiring correction and that the said Letters Patent should read as corrected below.

Column 2, line 45, for "wtih" read -- with --; column 8 lines 72 to 74, for that portion of the formula reading Signed and sealed this 28th day of April 1964.

(SEAL)
Attest:
ERNEST W. SWIDER

Attesting Officer

EDWARD J. BRENNER
Commissioner of Patents